(12) United States Patent
Morinaga et al.

(10) Patent No.: US 8,741,047 B2
(45) Date of Patent: Jun. 3, 2014

(54) NON-AQUEOUS PIGMENT INK

(75) Inventors: Marie Morinaga, Ibaraki-ken (JP); Teruaki Okawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 13/445,515

(22) Filed: Apr. 12, 2012

(65) Prior Publication Data

US 2012/0266779 A1 Oct. 25, 2012

(30) Foreign Application Priority Data

Apr. 21, 2011 (JP) ................ P2011-094830

(51) Int. Cl.
*C09D 11/02* (2006.01)

(52) U.S. Cl.
USPC ....................................... 106/31.6

(58) Field of Classification Search
USPC ....................................... 106/31.6
See application file for complete search history.

(56) References Cited

U.S. PATENT DOCUMENTS

| | | | |
|---|---|---|---|
| 8,177,899 B2 | 5/2012 | Endo | |
| 2003/0083410 A1 * | 5/2003 | Baur et al. | 524/190 |
| 2004/0254264 A1 * | 12/2004 | Suzuki et al. | 523/160 |
| 2005/0223939 A1 * | 10/2005 | Uozumi et al. | 106/31.58 |
| 2007/0263018 A1 * | 11/2007 | Vanini | 347/1 |
| 2009/0088500 A1 * | 4/2009 | Nishimoto et al. | 524/88 |

FOREIGN PATENT DOCUMENTS

| | | |
|---|---|---|
| CN | 1158631 A | 9/1997 |
| CN | 101845247 A | 9/2010 |
| JP | 2008150440 | 7/2008 |
| JP | 2010-202858 A | 9/2010 |

* cited by examiner

*Primary Examiner* — Veronica F Faison
(74) *Attorney, Agent, or Firm* — Nath, Goldberg & Meyer; Jerald L. Meyer; Sanjana Mangalagiri

(57) ABSTRACT

A non-aqueous pigment ink that exhibits excellent color reproducibility and storage stability. The non-aqueous pigment ink contains two or more lake pigments and a non-aqueous solvent.

8 Claims, No Drawings

NON-AQUEOUS PIGMENT INK

CROSS REFERENCE TO RELATED APPLICATIONS

This Application is based upon and claims the benefit of priority from prior Japanese Patent Applications No. 2011-094830 filed on Apr. 21, 2011, the entire contents of which are incorporated by reference herein.

BACKGROUND OF THE INVENTION

1. Field of the Invention

The present invention relates to a non-aqueous pigment ink.

2. Description of the Related Art

An inkjet recording method is a printing method in which printing is conducted by spraying a liquid ink with a high degree of fluidity from very fine nozzles, and adhering that ink to a recording medium such as a sheet of plain paper. This type of method enables the printing of high-resolution, high-quality images at high speed and with minimal noise, using a comparatively inexpensive printing apparatus, and is rapidly becoming widespread.

The coloring materials for inks used in inkjet recording systems can be broadly classified into pigments and dyes. Of these, there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. Non-aqueous inks that do not use water as the ink solvent, including solvent-based inks that use a volatile solvent as the main constituent and oil-based inks that use a non-volatile solvent as the main constituent, exhibit superior stability within the printer (such as intermittent dischargeability and discharge recovery following standing idle for a long period), cause no curling of the recorded medium and have a short ink penetration and drying time, and are therefore attracting considerable attention.

On the other hand, some inks may be prepared by combining two or more different pigments in order to achieve a printed item of a specific target color. However, in the case of a non-aqueous ink, when a color is prepared by combining pigments, achieving satisfactory color reproducibility tends to be difficult, and in particular, the saturation (or chroma) of the printed image may deteriorate. Among the various colors, achieving satisfactory color reproducibility for red colors is particularly problematic.

Further, because non-aqueous pigment inks for inkjet printing are used at comparatively low viscosities, achieving satisfactory storage stability is desirable, but when two or more pigments are mixed, achieving satisfactory storage stability for the ink tends to become more difficult.

Patent Document 1 proposes an ink comprising a pigment formed from a solid solution of C.I. Pigment Red 202 and C.I. Pigment Violet 19, wherein the primary particle size and particle size distribution of the pigment satisfy specific values. However, the Patent Document 1 describes only an aqueous medium ink, and makes no disclosure regarding non-aqueous inks.

Patent Document 1: JP 2010-202858 A

An object of the present invention is to provide a non-aqueous pigment ink that exhibits excellent color reproducibility and storage stability.

SUMMARY OF THE INVENTION

One aspect of the present invention provides a non-aqueous pigment ink comprising two or more lake pigments and a non-aqueous solvent.

DETAILED DESCRIPTION OF THE EMBODIMENTS

Embodiments according to the present invention are described below, but the examples presented in these embodiments in no way limit the scope of the present invention.

The non-aqueous pigment ink according to an embodiment of the present invention (hereafter also referred to as simply "the ink") comprises two or more lake pigments and a non-aqueous solvent. By preparing the ink in this manner, a non-aqueous pigment ink that exhibits excellent color reproducibility and storage stability can be provided.

Here, the color reproducibility can be evaluated from the chroma value. The chroma $C^*$ is determined from the formula shown below, in accordance with the definition of the CIE (1976) $L^*a^*b^*$ color space by the International Commission on Illumination.

$$\text{Chroma } C^* = \{(a^*)^2 + (b^*)^2\}^{1/2}$$

In this formula, $a^*$ and $b^*$ are the color coordinates $a^*$ and $b^*$ respectively within the $L^*a^*b^*$ color system.

The chroma can be measured using a Color Analyzer TC-1800MK-II manufactured by Tokyo Denshoku Co., Ltd.

In particular, in the case of a red printed item, the chroma is preferably at least 56 but less than 62, and is more preferably at least 59 but less than 62. If the chroma is less than 56, then the red coloration is inadequate and the image may appear dull, whereas if the chroma is 62 or greater, then the red coloration becomes excessive and may irritate the eye, either of which is undesirable.

In those cases when only a single pigment is used, achieving good color reproducibility at an appropriate chroma may be difficult. Further, when pigments are used in combination, if one lake pigment is combined with another pigment that is not a lake pigment, then not only is it difficult to achieve good color reproducibility at an appropriate chroma, but the storage stability also tends to deteriorate. In contrast, the inventors discovered that from the viewpoints of achieving favorable color reproducibility and storage stability, combining two or more lake pigments was effective.

The ink of the present embodiment comprises two or more lake pigments.

The lake pigments are preferably soluble azo pigments, and specific examples include C.I. Pigment Red 48:1, C.I. Pigment Red 48:2, C.I. Pigment Red 48:3, C.I. Pigment Red 48:4, C.I. Pigment Red 48:5, C.I. Pigment Red 49, C.I. Pigment Red 49:1, C.I. Pigment Red 49:2, C.I. Pigment Red 49:3, C.I. Pigment Red 52:1, C.I. Pigment Red 52:2, C.I. Pigment Red 53:1, C.I. Pigment Red 54, C.I. Pigment Red 57:1, C.I. Pigment Red 58, C.I. Pigment Red 58:1, C.I. Pigment Red 58:2, C.I. Pigment Red 58:3, C.I. Pigment Red 58:4, C.I. Pigment Red 60:1, C.I. Pigment Red 63, C.I. Pigment Red 63:1, C.I. Pigment Red 63:2, C.I. Pigment Red 63:3, C.I. Pigment Red 64:1, C.I. Pigment Red 68, C.I. Pigment Red 81, C.I. Pigment Red 81:1, C.I. Pigment Red 200, C.I. Pigment Red 237, C.I. Pigment Red 239 and C.I. Pigment Red 247.

Besides the red pigments listed above, lake pigments of other colors may also be used. Examples include C.I. Pigment Blue 1, C.I. Pigment Blue 2, C.I. Pigment Blue 3, C.I. Pigment Blue 9, C.I. Pigment Blue 10, C.I. Pigment Blue 17:1, C.I. Pigment Blue 24, C.I. Pigment Blue 24:1, C.I. Pigment Blue 56, C.I. Pigment Blue 61, C.I. Pigment Blue 62, C.I. Pigment Violet 1, C.I. Pigment Violet 2, C.I. Pigment Violet 3, C.I. Pigment Violet 3:1, C.I. Pigment Violet 3:3, C.I. Pigment Violet 27, C.I. Pigment Violet 39, C.I. Pigment Green 1, C.I. Pigment Green 4, C.I. Pigment Yellow 61, C.I. Pigment Yellow 61:1, C.I. Pigment Yellow 62, C.I. Pigment Yellow 100, C.I. Pigment Yellow 104, C.I. Pigment Yellow 133, C.I. Pigment Yellow 168, C.I. Pigment Yellow 169, C.I. Pigment Yellow 183, C.I. Pigment Yellow 191, C.I. Pigment Yellow 191:1, C.I. Pigment Yellow 206, C.I. Pigment Yellow 209, C.I. Pigment Yellow 209:1 and C.I. Pigment Yellow 212.

These pigments are preferably combined with other pigments of similar hue.

The combination of the lake pigments may, for example, use a combination of two or more lake pigments selected appropriately from the pigments listed above. A combination containing one or more soluble azo pigments is preferred. In such cases, the amount of the soluble azo pigment(s) preferably represents at least 20% by mass, more preferably at least 50% by mass, and still more preferably 75% by mass or more, of the total mass of pigments.

Preferred combinations of lake pigments include one or more pigments selected from among C.I. Pigment Red 48:1 (Ba lake of Permanent Red 2B), C.I. Pigment Red 48: 3 (Sr lake of Permanent Red 2B) and C.I. Pigment Red 57:1 (Ca lake of Brilliant Carmine 6B). In particular, the pigment composition preferably comprises C.I. Pigment Red 48:1, or a combination of C.I. Pigment Red 48:1 and C.I. Pigment Red 48:3.

Examples of specific preferred combinations include a two-pigment combination of C.I. Pigment Red 48:1 and C.I. Pigment Red 48:3, and a three-pigment combination of C.I. Pigment Red 48:1, C.I. Pigment Red 48:3 and C.I. Pigment Red 57:1.

There are no particular limitations on the amount of each of the lake pigments relative to the total mass of pigments. When the pigment combination comprises C.I. Pigment Red 48:1, the amount of the C.I. Pigment Red 48:1 is preferably at least 50% by mass, and more preferably 75% by mass or more, of the total mass of pigments. When the pigment combination comprises C.I. Pigment Red 48:3, the amount of the C.I. Pigment Red 48:3 is preferably not more than 25% by mass, and more preferably 20% by mass or less, of the total mass of pigments. When the pigment combination comprises C.I. Pigment Red 57:1, the amount of the C.I. Pigment Red 57:1 is preferably 30% by mass or less of the total mass of pigments.

The ink of the present embodiment may also contain coloring materials other than the lake pigments, such as inorganic pigments, other organic pigments or dyes or the like, provided that the effects of the present invention are not impaired, and in particular, that the color reproducibility and storage stability are maintained within favorable ranges.

In terms of achieving favorable dispersibility and storage stability, the average particle size of the pigments is preferably not more than 300 nm, and more preferably 150 nm or less. Here, the average particle size of a pigment refers to the value measured using a dynamic light-scattering particle size distribution measurement apparatus LB-500 manufactured by Horiba, Ltd.

The total pigment content within the ink is typically within a range from 0.01 to 20% by mass, and from the viewpoints of the print density and the ink viscosity, is preferably within a range from 3 to 15% by mass.

The ink of the present embodiment may also comprise a pigment dispersant. There are no particular limitations on the pigment dispersant, provided it is capable of stably dispersing the pigment within the solvent. Examples of pigment dispersants that may be used include hydroxyl group-containing carboxylate esters, salts of long-chain polyaminoamides and high molecular weight acid esters, salts of high molecular weight polycarboxylic acids, salts of long-chain polyaminoamides and polar acid esters, high molecular weight unsaturated acid esters, high molecular weight copolymers, modified polyurethanes, modified polyacrylates, polyetherester-type anionic activators, naphthalenesulfonic acid formalin condensate salts, polyoxyethylene alkyl phosphate esters, polyoxyethylene nonylphenyl ethers, polyester polyamines and stearylamine acetate, and of these, the use of a polymer dispersant is particularly desirable. These pigment dispersants may be used individually, or a plurality of dispersants may be used in combination.

Specific examples of commercially available pigment dispersants include Solsperse 13940 (a polyesteramine system), 17000 and 18000 (fatty acid amine systems), and 11200, 22000, 24000 and 28000 (all product names) manufactured by The Lubrizol Corporation, Florene DOPA-15B (a product name) manufactured by Kyoeisha Chemical Co., Ltd., DA-703-50, DA-7300 and DA234 (all product names) manufactured by Kusumoto Chemicals Ltd., Disperbyk 101 (a product name) manufactured by BYK Chemie, Hinoact (a product name) manufactured by Kawaken Fine Chemicals Co., Ltd., Antaron V-216, Ganex V-216, Antaron V-220 and Ganex V-220 (all product names) manufactured by ISP Corporation, and Unimer U-151 and Unimer U-15 (both product names) manufactured by Induchem AG.

The amount of the pigment dispersant added to the non-aqueous ink may be set as appropriate, but from the viewpoint of pigment dispersibility, the amount of the pigment dispersant is preferably within a range from approximately 0.05 to 1.0 parts by mass, and more preferably from 0.1 to 1.0 parts by mass, per 1 part by mass of the pigment. Relative to the total mass of the ink, the pigment dispersant content is preferably within a range from approximately 0.5 to 10% by mass, and more preferably from 1 to 8% by mass.

The non-aqueous ink also comprises a non-aqueous solvent. Here, the expression "non-aqueous solvent" refers to non-polar organic solvents and polar organic solvents for which the 50% distillation point is at least 150° C. The "50% distillation point" is measured in accordance with JIS K0066 "Test Methods for Distillation of Chemical Products" and refers to the temperature at which 50% by mass of the solvent is evaporated.

For example, examples of preferred non-polar organic solvents include aliphatic hydrocarbon solvents, alicyclic hydrocarbon solvents and aromatic hydrocarbon solvents. Specific examples of preferred aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by Nippon Oil Corporation; Isopar G, Isopar H, Isopar L, Isopar M, Exxsol D40, Exxsol D80, Exxsol D100, Exxsol D130 and Exxsol D140, all manufactured by Exxon Mobil Corporation; and Normal Paraffin H manufactured by Japan Energy Corporation. Specific examples of preferred aromatic hydrocarbon solvents include Nisseki Cleansol G (alkylbenzene) manufactured by Nippon Oil Corporation and Solvesso 200 manufactured by Exxon Mobil Corporation.

Examples of solvents that can be used as the polar organic solvent include ester-based solvents, alcohol-based solvents, higher fatty acid-based solvents, ether-based solvents, and mixtures thereof. For example, one or more solvents selected from the group consisting of ester-based solvents composed of an ester of a higher fatty acid of 8 to 20 carbon atoms and an alcohol of 1 to 24 carbon atoms, higher alcohols of 8 to 24 carbon atoms, and higher fatty acids of 8 to 20 carbon atoms can be used favorably.

Specific examples of preferred polar organic solvents include ester-based solvents such as methyl laurate, isopropyl laurate, isopropyl myristate, isooctyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol, oleyl alcohol, hexyldecanol, octyldodecanol and decyltetradecanol; higher fatty acid-based solvents such as nonanoic acid, isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether and propylene glycol dibutyl ether.

These non-aqueous solvents may be used individually, or two or more solvents may be used in combination.

In addition to the components described above, the non-aqueous ink may also comprise appropriate amounts of other arbitrary components such as surface tension modifiers (penetrants), antifoaming agents and antioxidants.

Examples of materials that may be used as surface tension modifiers or antifoaming agents or the like include anionic surfactants, cationic surfactants, amphoteric surfactants, nonionic surfactants, or polymer-based, silicone-based or fluorine-based surfactants.

Examples of compounds that may be used as antioxidants include dibutylhydroxytoluene, propyl gallate, tocopherol, butylhydroxyanisole and nordihydroguaiaretic acid, and these compounds may be used individually, or in mixtures containing two or more different compounds.

The ink can be prepared by mixing the various components using any appropriate dispersion device such as a ball mill or a beads mill or the like. For example, the ink can be produced by first preparing a pigment dispersion comprising the pigment, the pigment dispersant and the non-aqueous solvent, and then adding additional non-aqueous solvent and any other optional components. The non-aqueous solvent (or diluting solvent) used during preparation of the pigment dispersion is preferably the same as the non-aqueous solvent incorporated within the ink, and in those cases where the dispersant is synthesized by solution polymerization, is preferably the same as the polymerization solvent.

The non-aqueous ink can be used favorably within an inkjet recording apparatus. When used as an inkjet ink, the ideal range for the viscosity of the ink varies depending on factors such as the diameter of the discharge head nozzles and the discharge environment, but at 23° C. is typically within a range from 5 to 30 mPa·s, preferably from 5 to 15 mPa·s, and more preferably from 5 to 13 mPa·s. Here, the viscosity is measured at 23° C. by raising the shear stress from 0 Pa at a rate of 0.1 Pa/s, and refers to the measured value at 10 Pa.

Although there are no particular limitations on the printing method used with the non-aqueous pigment ink of the present embodiment, the non-aqueous pigment ink can be used favorably for printing to a recording medium using an inkjet recording method. The inkjet recording method may employ any of various printing systems, including piezo systems, electrostatic systems and thermal systems. In those cases where an inkjet recording apparatus is used, the ink is discharged from the inkjet head based on a digital signal, and the discharged ink droplets are adhered to a recording medium. A line head system may also be used as the inkjet recording method, and this type of line head-type inkjet recording method enables printing to be performed at a rapid printing speed.

There are no particular limitations on the recording medium, and examples of media that may be used include plain paper, high-quality plain paper, inkjet (LI) paper, IJ matte paper, coated paper in which the recording medium has been coated with an ink-absorbing liquid, fine coated paper in which the ink-absorbing layer is thinner than that of a coated paper, glossy paper (photo glossy paper), special paper, and fabric.

The present invention is able to provide a non-aqueous pigment ink that exhibits excellent color reproducibility and storage stability.

EXAMPLES

A more detailed description of the present invention is provided below based on a series of examples, but the present invention is in no way limited by these examples.

<Ink>

One or more pigments, a pigment dispersant and a portion of a solvent shown in Table 1 were mixed together, zirconia beads (diameter: 0.5 mm) were added, and the mixture was dispersed for 120 minutes using a rocking mill (manufactured by Seiwa Technical Lab Co., Ltd.). Following dispersion, the zirconia beads were removed to obtain a pigment dispersion. Subsequently, the pigment dispersion was diluted by adding the remainder of the solvent, and the dispersion was then filtered sequentially through 3.0 μm and 0.8 μm membrane filters to remove any contaminants and coarse particles, thus completing preparation of an ink.

Each of the components shown in Table 1 is detailed below.

C.I. Pigment Red 48:1: a soluble azo pigment, Ba lake of Permanent Red 2B

C.I. Pigment Red 48:3: a soluble azo pigment, Sr lake of Permanent Red 2B

In Table 1, C.I. Pigment Red 48:1 and C.I. Pigment Red 48:3 were used in the form of a product: Fuji Red 5R 734, manufactured by Fuji Pigment Co., Ltd., composed of a mixture of C.I. Pigment Red 48:1 and C.I. Pigment Red 48:3 in a ratio of 8:2 (mass ratio).

C.I. Pigment Red 57:1: a soluble azo pigment, Ca lake of Brilliant Carmine 6B, product name: Symuler Brilliant Carmine 6B 321, manufactured by DIC Corporation C.I. Pigment Red 122: a quinacridone pigment, 2,9-dimethylquinacridone, product name: Fastogen Super Magenta RH, manufactured by DIC Corporation C.I. Pigment Violet 19: a quinacridone pigment, unsubstituted quinacridone, product name: Hostaperm Red E3B, manufactured by Clariant (Japan) K.K.

C.I. Pigment Red 202: a quinacridone pigment, 2,9-dichloroquinacridone, product name: Quindo Magenta 202, manufactured by DIC Corporation C.I. Pigment Red 146: an insoluble azo pigment, Permanent Carmine FBB, product name: Permanent Carmine FB B02, manufactured by Clariant (Japan) K.K.

S11200: Solsperse 11200, manufactured by The Lubrizol Corporation

Isooctyl palmitate: an ester-based solvent, product name: Nikkol IOP, manufactured by Nikko Chemicals Co., Ltd.

AF4: a petroleum-based hydrocarbon solvent, product name: AF Solvent No. 4 (a naphthene-based solvent), manufactured by Nippon Oil Corporation Isomyristyl alcohol: a higher alcohol-based solvent, product name: FOC140N, manufactured by Nissan Chemical Industries, Ltd., carbon number: 14

<Evaluations>

The chroma and storage stability were evaluated for each of the inks from the examples and comparative examples. The results are shown in Table 1.

(Preparation of Printed Item)

Using an inkjet head (CB2 head, manufactured by Toshiba TEC Corporation), printed items were prepared under the printing conditions listed below.

Resolution: 300 dpi×300 dpi
Number of drops: 5 drops
Image: solid image
Paper: Riso light paper (manufactured by Riso Kagaku Corporation)

(Chroma)

One day after preparation, the printed item was measured using a Color Analyzer TC-1800MK-II manufactured by Tokyo Denshoku Co., Ltd., and the measurement result was evaluated against the following criteria.

$$\text{Chroma } C^* = \{(a^*)^2 + (b^*)^2\}^{1/2}$$

A: chroma is at least 59 but less than 62
B: chroma is at least 56 but less than 59
C: chroma is less than 56 or at least 62

(Ink Viscosity)

The viscosity of each ink refers to the viscosity at 10 Pa when the shear stress was raised from 0 Pa at a rate of 0.1 Pa·s and at a temperature of 23° C., and was measured using a controlled stress rheometer RS75 manufactured by Haake GmbH (cone angle: 1°, diameter: 60 mm). The results revealed that all of the inks had a viscosity within the ideal viscosity range for inkjet inks of 5 to 13 mPa·s.

(Ink Storage Stability)

Each of the prepared inks was placed in a sealed container and left to stand for 4 weeks at 70° C. The change in viscosity of the ink was then measured, and the measurement result was evaluated against the following criteria.

Change in viscosity: [(Viscosity after 4 weeks×100)/(Initial viscosity)]−100(%)

A: change in viscosity of less than 5%
B: change in viscosity of at least 5% but less than 10%
C: change in viscosity of at least 10%

TABLE 1

| (% by mass) | | Example 1 | Example 2 | Example 3 | Example 4 | Comparative example 1 | Comparative example 2 | Comparative example 3 | Comparative example 4 | Comparative example 5 | Comparative example 6 |
|---|---|---|---|---|---|---|---|---|---|---|---|
| Pigment | C.I. Pigment Red 48:1 | 4.0 | 3.6 | 2.8 | 2.4 | 5.0 | — | — | — | — | — |
| | C.I. Pigment Red 48:3 | 1.0 | 0.9 | 0.7 | 0.6 | — | — | — | — | — | — |
| | C.I. Pigment Red 57:1 | — | 0.5 | 1.5 | 2.0 | — | 5.0 | 4.5 | 4.5 | 4.5 | — |
| | C.I. Pigment Red 122 | — | — | — | — | — | — | 0.5 | — | — | — |
| | C.I. Pigment Violet 19 | — | — | — | — | — | — | — | 0.5 | — | 2.5 |
| | C.I. Pigment Red 202 | — | — | — | — | — | — | — | — | — | 2.5 |
| | C.I. Pigment Red 146 | — | — | — | — | — | — | — | — | 0.5 | — |
| Pigment dispersant | S11200 | 4.0 | 4.0 | 4.0 | 4.0 | 4.0 | 4.0 | 4.0 | 4.0 | 4.0 | 4.0 |
| Non-aqueous solvent | Isooctyl palmitate | 41.0 | 41.0 | 41.0 | 41.0 | 41.0 | 41.0 | 41.0 | 41.0 | 41.0 | 41.0 |
| | AF-4 | 40.0 | 40.0 | 40.0 | 40.0 | 40.0 | 40.0 | 40.0 | 40.0 | 40.0 | 40.0 |
| | Isomyristyl alcohol | 10.0 | 10.0 | 10.0 | 10.0 | 10.0 | 10.0 | 10.0 | 10.0 | 10.0 | 10.0 |
| Total | | 100.0 | 100.0 | 100.0 | 100.0 | 100.0 | 100.0 | 100.0 | 100.0 | 100.0 | 100.0 |
| Evaluations | Chroma | A | B | B | B | C | C | C | C | C | C |
| | Storage stability | A | B | B | B | B | B | C | C | C | C |

As shown in Table 1, the inks of each of the examples exhibited superior chroma and storage stability. The inks of comparative examples 1 and 2 contained only a single lake pigment, and the chroma was unsatisfactory. The inks of comparative examples 3 and 4 contained a combination of a lake pigment and a quinacridone pigment, the ink of comparative example 5 contained a combination of a lake pigment and an insoluble azo pigment, and the ink of comparative example 6 contained a combination of two quinacridone pigments, but all of these inks exhibited unsatisfactory chroma and poor storage stability.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A non-aqueous pigment ink, comprising two or more lake pigments and a non-aqueous solvent, wherein at least one of the two lake pigments is C.I. Pigment Red 48:1, and wherein the C.I. Pigment Red 48:1 represents at least 50% by mass of all pigments.

2. The non-aqueous pigment ink according to claim 1, wherein the two or more lake pigments further comprise at least one pigment selected from the group consisting of, C.I. Pigment Red 48:3 and C.I. Pigment Red 57:1.

3. The non-aqueous pigment ink according to claim 1, wherein the two or more lake pigments further comprise C.I. Pigment Red 48:3.

4. The non-aqueous pigment ink according to claim 1, wherein the C.I. Pigment Red 48:1 represents at least 75% by mass of the all pigments.

5. The non-aqueous pigment ink according to claim 2, wherein the C.I. Pigment Red 48:1 represents at least 75% by mass of all pigments.

6. The non-aqueous pigment in according to claim 2, wherein the C.I. Pigment Red 48:3 represents 25% or less by mass of all pigments.

7. The non-aqueous pigment ink according to claim 2, wherein the C.I. Pigment Red 57:1 represents 30% or less by mass of all pigments.

8. The non-aqueous pigment ink according to claim 6, wherein the C.I. Pigment Red 57:1 represents 30% or less by mass of all pigments.

* * * * *